UNITED STATES PATENT OFFICE.

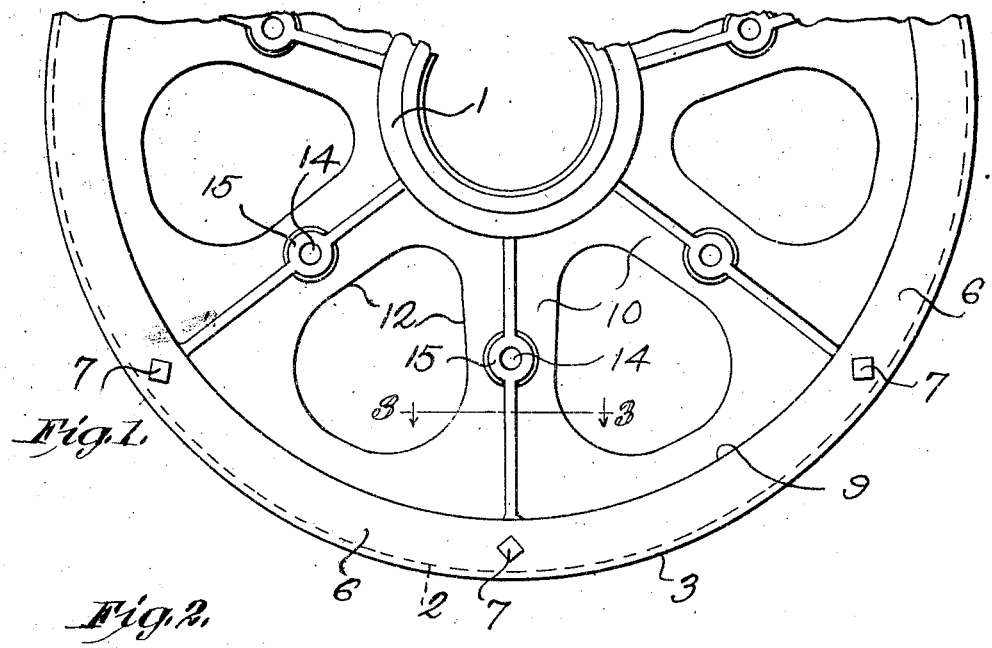
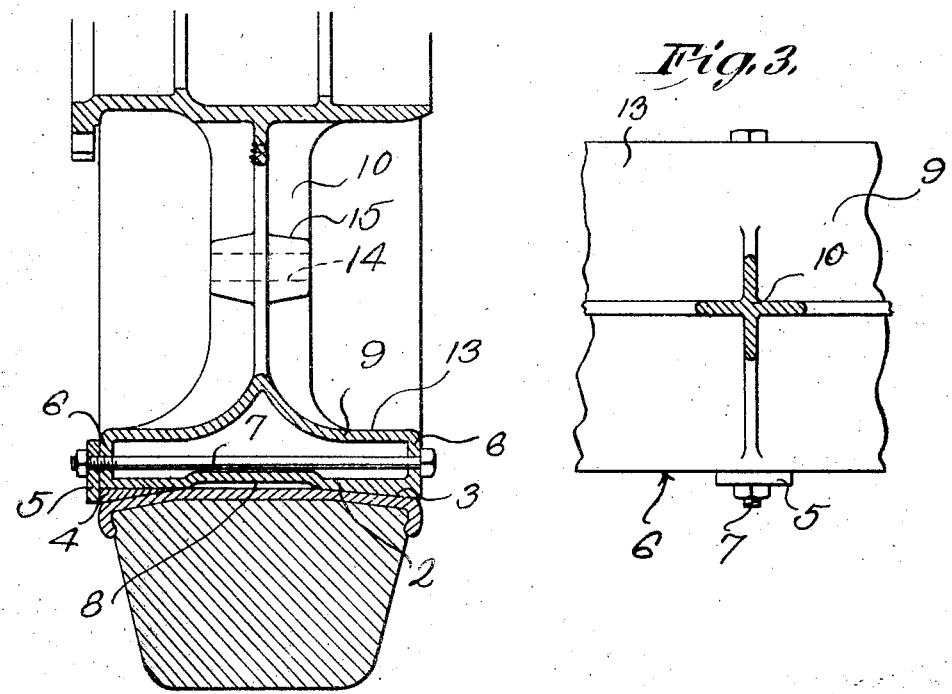

GEORGE WALTHER, OF DAYTON, OHIO.

METAL WHEEL.

1,293,263.

Specification of Letters Patent.

Patented Feb. 4, 1919.

Application filed October 8, 1917. Serial No. 195,273.

*To all whom it may concern:*

Be it known that I, GEORGE WALTHER, a citizen of the United States, residing at Dayton, in the county of Montgomery and State of Ohio, have invented certain new and useful Improvements in Metal Wheels, of which the following is a specification, reference being had therein to the accompanying drawing.

This invention relates to metal wheels and more particularly to wheels which are designed for use with automobile trucks, and which are cast in one piece.

The object of the invention is to provide a wheel of this kind which will combine strength with lightness; and which, when adapted for use with a demountable rim will comprise but few pieces.

It is also an object of the invention to so construct the wheel that the rim will have no recesses within which dirt or mud can accumulate.

It is a further object of the invention to so construct a wheel that it can be easily cast, thus maintaining the cost of production at a low figure.

It is also an object of the invention to provide such a wheel in which a portion of the rim of the wheel will constitute a brake member.

In the accompanying drawings Figure 1 is a side elevation of a portion of a wheel embodying my invention; Fig. 2 is a sectional view taken transversely of the rim showing a spoke in elevation; and Fig. 3 is a transverse sectional view of one of the spokes.

In these drawings I have illustrated one embodiment of my invention and have shown the same as comprising a hub 1 about which extends a hollow rim which is connected with the hub by means of solid spokes which are cast integral with the hub and the rim. As here shown the hollow rim comprises a substantially flat outer wall 2 which, however, is provided near one edge with a thickened portion 3 to form an abutment against which the demountable rim may be clamped. This thickened portion is preferably tapered to correspond to the tapered rim or annular wedge 4 which is placed at the opposite side of the demountable rim after the latter has been placed in position and is clamped in position by means of plates or clips 5 placed against the adjacent side walls 6 of the rim and extending across the end of the wedge-shaped ring 4. The plates, or clips, are secured in position by bolts 7 extending through the side walls 6 of the rim and through the respective clips or plates 5. The outer wall of the rim is here shown as having a series of openings 8, but these are provided merely to permit the removal of the core and are not an essential part of the invention. The outer wall is also provided, between the openings, with a central channel or depression to minimize the amount of machining necessary. The side walls 6 of the rim are substantially parallel and are formed integral with the outer wall 2 and with the inner wall 9. This inner wall has its side portions curved inwardly and converging toward the hub so as to form a substantially V-shaped portion along the center of the inner wall, the apex of which lies substantially in a plane extending through the center of the hub. The spokes 10, which are cast integral with the hub and the rim, are solid and flat in shape, and extend from the apex of the V-shaped center portion of the inner wall of the rim to the hub. Each spoke is provided on its opposite sides with laterally projecting ribs 11 which extend from the hub to the rim and are formed integral with these parts at the respective ends thereof. At the outer end of each spoke the ribs for that spoke extend beyond the end of the body portion of the spoke, along the converging walls of the V-shaped portion of the inner wall of the rim, the end portions being curved outwardly and being tapered toward the respective edges of the rim. The spokes are here shown in the form of a web extending between the rim and the hub and having between the several ribs substantially triangular openings as shown at 12 in Fig. 1. This construction of the rim and spokes provides a very strong structure in which the strains will be distributed over a large portion of the rim and which is at the same time of relatively light weight and of a neat attractive appearance. In the present construction the inner wall of the rim is provided along one side of the spokes with a substantially flat friction surface, as shown at 13, which constitutes a brake member to coöperate with the friction shoes of the brake mechanism. Each spoke may, if desired, be provided with transverse holes 14 reinforced by bosses 15 formed integral with the ribs 11 to permit of a sprocket wheel or other driving member, or the like being bolted to it. While, of course, any suitable number of spokes may be used I have found that when seven spokes are employed the arrangement and spacing are such as to give excellent results.

The wheel thus constructed is, as has been explained, not only very light and very strong but consists of a single piece with no parts or joints to become separated or broken, and it is, also, so constructed as to receive and secure thereto a demountable rim with the use only of a single clamping ring and the necessary clips and bolts. The rim is hollow and is consequently very light although having great strength. The side walls or flanges through which the bolts 7 extend are connected one to the other by the inner wall of the rim which completely closes the space between the side walls and flanges and prevents the entrance of mud and other foreign matter into the rim. By forming the brake drum integral with the rim this additional part is dispensed with as well as the bolts and other attaching devices. The construction of the rim and of the spokes is such that the wheel is easily cast and for this reason as well as because of the relatively small amount of metal contained within the same it can be produced at a low cost.

While I have shown and described one embodiment of my invention I wish it to be understood that I do not desire to be limited to the details of construction as various modifications will occur to a person skilled in the art.

Having now fully described my invention, what I claim as new and desire to secure by Letters Patent, is:—

1. In a metal wheel, a hub, a hollow rim having inner and outer walls and substantially parallel side walls, said inner wall being continuous throughout the circumference of said rim and having an inwardly extending V-shaped portion arranged centrally thereof, and flat spokes extending between and cast integral with said hub and the apex of the V-shaped portion of the inner wall of said rim, each having laterally projecting ribs on the opposite sides thereof and extending for the full length thereof, said ribs having their outer end portions extending beyond the apex of the V-shaped portion of the inner wall of said rim and along the converging portions of said inner wall and tapered toward the respective edges of said rim.

2. In a metal wheel, a hub, a hollow rim having inner and outer walls and substantially parallel side walls to receive bolts, said inner wall having its opposite side portions curved inwardly and converging toward said hub, and flat spokes cast integral with said hub and said rim, and each having laterally projecting ribs extending for the full length thereof, said ribs having their outer portions extending beyond the ends of the respective spokes along the converging portions of the inner wall of said rim and tapered toward the respective edges of said rim, the inner wall of said rim on one side of said spokes having a friction surface and constituting a brake member.

3. In a metal wheel, a hub, a hollow rim having inner and outer walls and substantially parallel side walls, said inner wall being continuous throughout the circumference of said rim and having an inwardly extending V-shaped portion arranged centrally thereof, a web of metal extending between and cast integral with said hub and the apex of the inner wall of said rim, and having openings therein spaced apart to form radial spokes, said openings having their outer ends rounded to provide the spokes with enlarged end portions, and also having integral ribs formed on both sides thereof and extending lengthwise of said spokes and integrally connected at their ends respectively with said hub and the converging walls of the V-shaped portion of the inner wall of said rim.

In testimony whereof, I affix my signature hereto.

GEORGE WALTHER.